United States Patent [19]

Cunningham

[11] Patent Number: 5,779,304
[45] Date of Patent: Jul. 14, 1998

[54] CHILD SAFETY SEAT WITH SELF-CONTAINED AIR BAG

[76] Inventor: Ronny L. Cunningham, Rte. 1, Box 182A, Parkton, N.C. 28371

[21] Appl. No.: 850,397

[22] Filed: May 2, 1997

[51] Int. Cl.⁶ .................................................. B60N 2/42
[52] U.S. Cl. .................................. 297/216.11; 297/250.1
[58] Field of Search .................... 297/216.11, 216.1, 297/250.1, 256.15, DIG. 3, 464, 487, 488; 280/728.1, 728.2, 728.3, 734, 728 B

[56] References Cited

U.S. PATENT DOCUMENTS

| | | |
|---|---|---|
| 3,706,462 | 12/1972 | Lilly ................................ 280/733 |
| 3,981,518 | 9/1976 | Pulling ........................ 297/216.1 X |
| 4,834,420 | 5/1989 | Sankrithi ..................... 297/250.1 X |
| 5,333,902 | 8/1994 | Hatfield ............................ 280/733 |
| 5,368,328 | 11/1994 | Kamiyama et al. .......... 297/216.11 X |
| 5,375,908 | 12/1994 | Goor ............................ 297/216.11 |
| 5,385,368 | 1/1995 | Bridge ............................. 280/733 |
| 5,390,952 | 2/1995 | Goor ......................... 297/216.11 X |
| 5,413,377 | 5/1995 | Kamiyama et al. ............... 280/733 |
| 5,511,850 | 4/1996 | Coursey ......................... 297/216.11 |
| 5,564,736 | 10/1996 | Kim ............................ 297/216.1 X |
| 5,653,501 | 8/1997 | Goor ............................ 297/216.11 |

*Primary Examiner*—Milton Nelson, Jr.
*Attorney, Agent, or Firm*—Patent & Trademark Services; Joseph H. McGlynn

[57] ABSTRACT

A child safety seat which has incorporated into it an inflatable air bag system. The air bags are contained in the sides of the seat and also in the front of the seat so the child is protected on all sides.

2 Claims, 1 Drawing Sheet

CHILD SAFETY SEAT WITH SELF-CONTAINED AIR BAG

BACKGROUND OF THE INVENTION

This invention relates, in general, to child safety seats, and, in particular, to a child safety seat with a self contained air bag.

DESCRIPTION OF THE PRIOR ART

In the prior art various types of safety seats have been proposed. For example, U.S. Pat. No. 3,706,462 discloses an inflatable air bag for the occupant of a car that is mounted on the occupant's seat belt.

U.S. Pat. No. 5,333,902 discloses a portable air bag with a passenger seat belt secured therein. The device includes a source of compressed gas and a sensor for detecting the occurrence of a collision.

U.S. Pat. No. 5,385,368 discloses an air bag safety assembly which includes a jacket which houses an inflatable air bag and means for inflating the air bag by relative elongation of an elastic connector.

U.S. Pat. No. 5,413,377 discloses an infant restraint protective seat with an inflatable seat belt that inflates when a collision occurs.

While most air bag systems have been proposed for adults, few have been designed to protect children in car safety seats. The devices which have been proposed for children, such as U.S. Pat. No. 5,413,377, incorporate the air bags into the child restraint straps. When these straps expand they place a considerable amount of pressure on solely the areas where the seat belts contact the child. This considerable amount of pressure in a relatively small area can cause injury to the child. In addition, the air bag systems do not restrain the child from being forced from side to side which could also lead to injury of the child.

SUMMARY OF THE INVENTION

The present invention is a child safety seat which has incorporated into it an inflatable air bag system. The air bags are contained in the sides of the seat and also in the front of the seat so the child is protected on all sides.

It is an object of the present invention to provide a new and improved safety seat for children incorporating an air bag system.

These and other objects and advantages of the present invention will be fully apparent from the following description, when taken in connection with the annexed drawings.

DESCRIPTION OF THE PREFERRED EMBODIMENT

Figure 1:
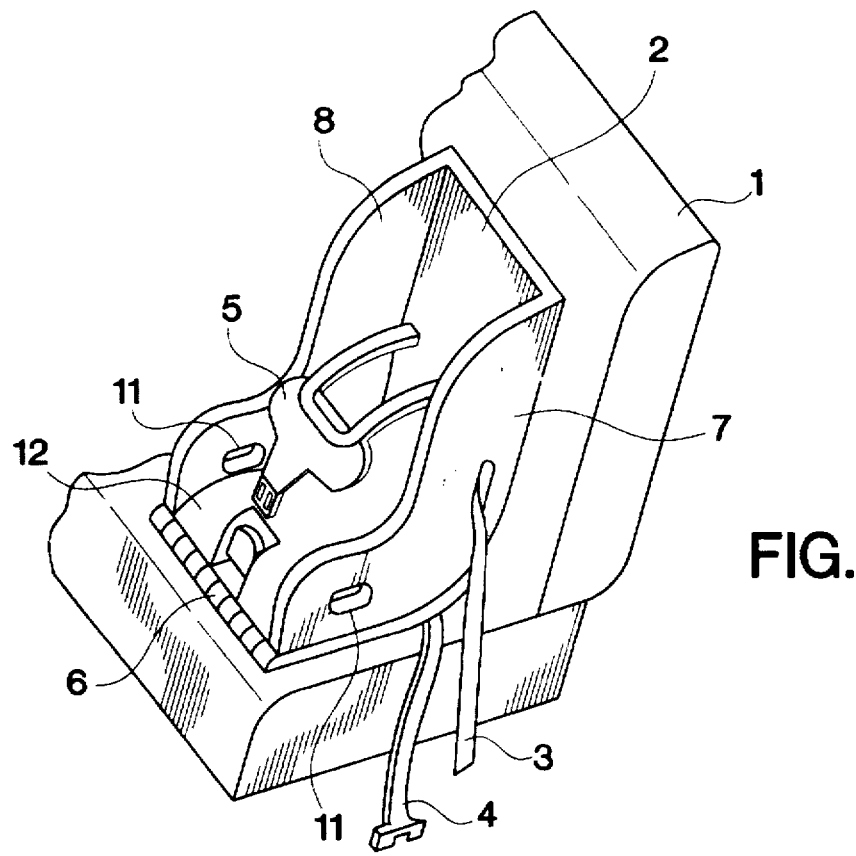
FIG 1 is a view of the child safety seat of the present invention.

Referring now to the drawings in greater detail, FIG. 1 shows a conventional car seat 1 which has a child safety seat 2 secured thereto. It should be noted that the specific type of child safety seat is not part of the present invention. The present invention could be used with any type of child safety seat Most child safety seats have means for attaching the car's shoulder belt 3 and means 11 for attaching the car's lap belt (not shown) to the child's safety seat. In addition a safety harness 5 is used to hold the child from coming forward in the seat.

The present invention would utilize side restraints or wings 7, 8 between which the child would sit on seat portion 12, when the child is placed in the child safety seat. One of the wings 7 would contain a first air bag 9 (see FIG. 2) which, when deployed, would extend across the seat in front of the child and engage opposite wing 8. Upon impact the air bag 9 would inflate and fill the entire space between the wings 7, 8 and prevent the upper part of the child's body from being thrown forward. Thus the air bag 9 would protect the child's upper torso in the case of a collision.

Figure 2:
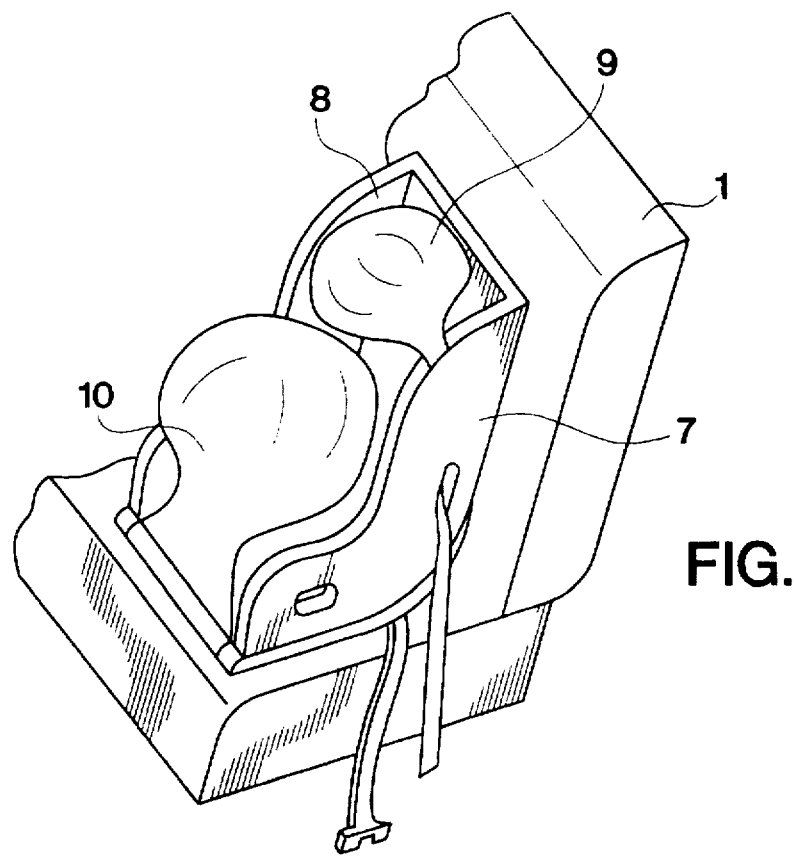
FIG 2 is a view of the present invention after the air bags have been deployed.

The bottom portion 6 of the child safety seat 2 would contain a second air bag 10, as shown in FIG. 2. Upon impact, the second air bag 10 would deploy upwards to protect the child's lower body. Therefore, the child's entire body would be protected by air bags on all sides, which would prevent injury in a more efficient manner than the protection devices currently employed.

The child restraint air bags of the present invention could be deployed in various ways. For example a connector 4 could be incorporated into the child seat which could be connected to the car's internal air bag deployment system so the child's air bags would be deployed by the car's internal system.

An alternative deployment system that could be used is a self contained $CO_2$ cartridge, similar to the one disclosed by Lilly (U.S. Pat. No. 3,706,462) which is hereby incorporated by reference.

Although the Child Safety Seat With Self Contained Air Bag and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A child safety seat for an automobile comprising:

a seat having a back, a seat portion and a pair of wings disposed on opposite sides of said back, one of said wings contains an air bag means which will deploy in the event that said automobile is involved in a collision, said air bag means extending completely from one of said wings to the other of said wings when deployed, a second air bag means contained in said seat portion, said second air bag means deploying upward toward said back in the event that said automobile is involved in a collision, means for deploying said air bags means in the event that said automobile is involved in a collision.

2. The child safety seat as claimed in claim 1, wherein said means for deploying said air bags means in the event that said automobile is involved in a collision is means connected to said automobile's main air bag system.

\* \* \* \* \*